Oct. 31, 1967
D. N. SEWELL
3,349,479
METHOD OF MANUFACTURING A COAXIAL ELECTRICAL
TRANSMISSION LINE
Original Filed Feb. 11, 1965
3 Sheets-Sheet 1
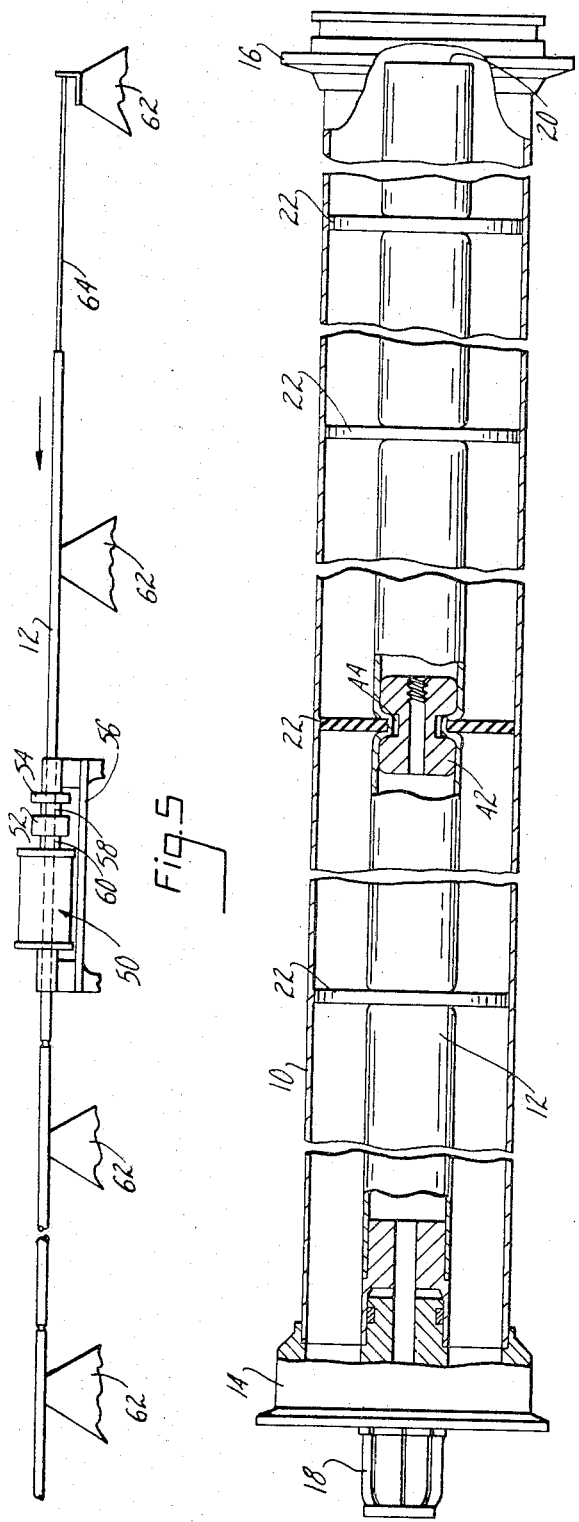

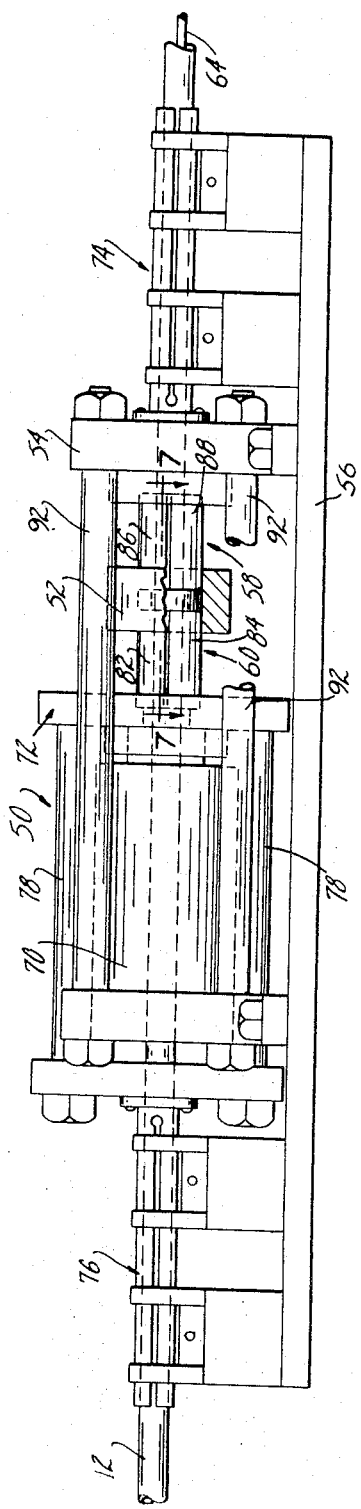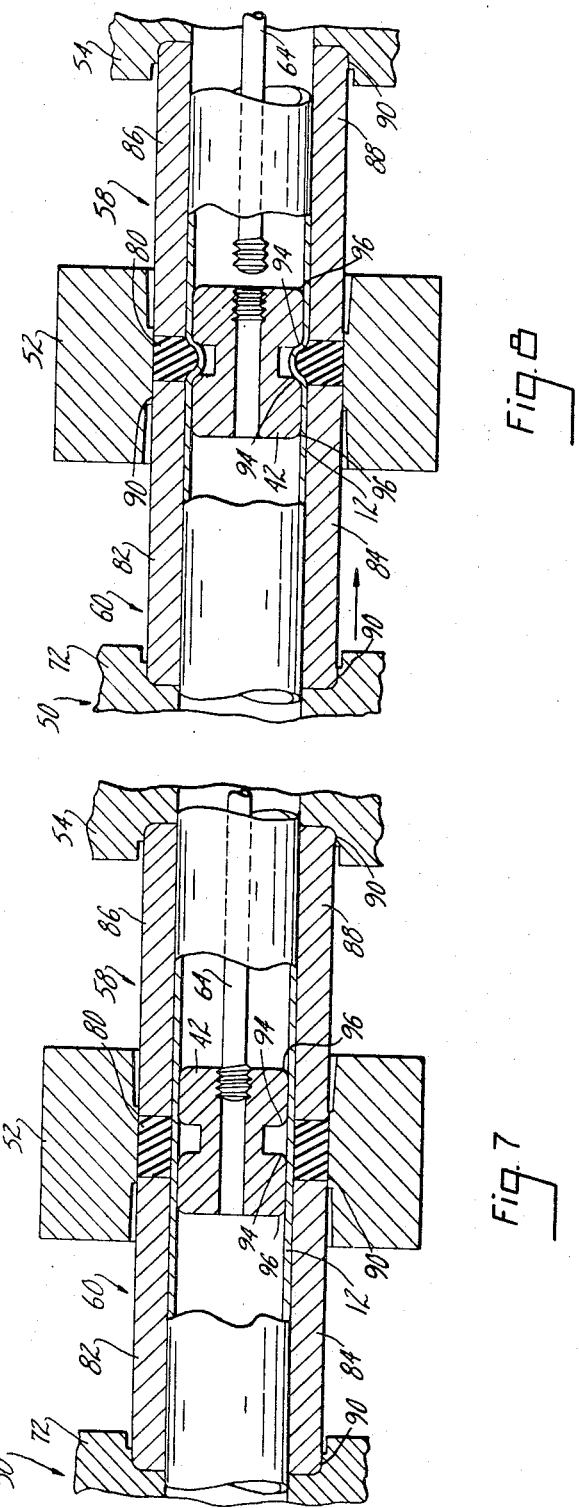

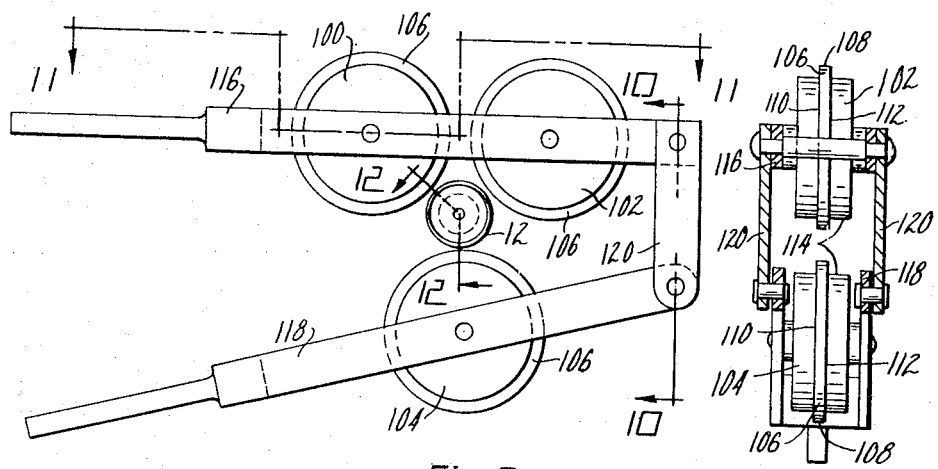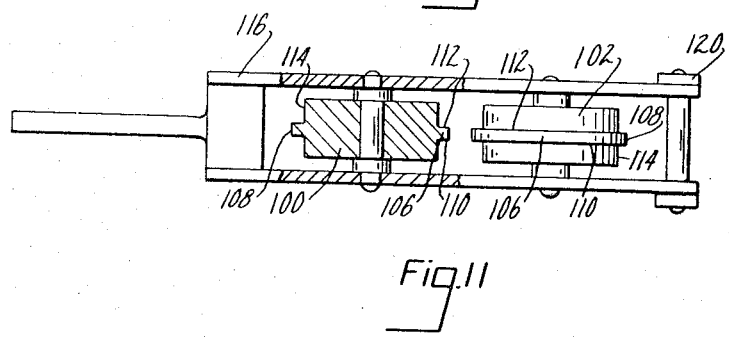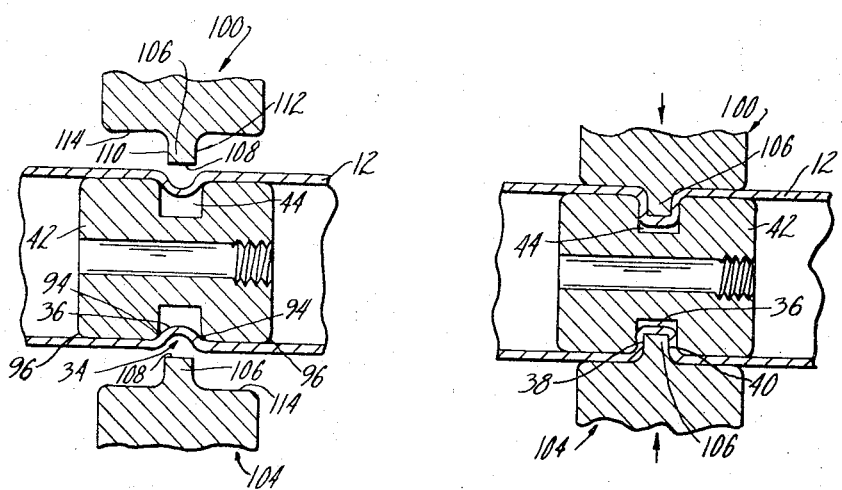

United States Patent Office 3,349,479
Patented Oct. 31, 1967

3,349,479
METHOD OF MANUFACTURING A COAXIAL ELECTRICAL TRANSMISSION LINE
Donald N. Sewell, Acton, Mass., assignor to Dielectric Products Engineering Company, Inc., Littleton, Mass., a corporation of Michigan
Original application Feb. 11, 1965, Ser. No. 431,829. Divided and this application Aug. 8, 1966, Ser. No. 571,045
5 Claims. (Cl. 29—600)

ABSTRACT OF THE DISCLOSURE

A coaxial RF transmission line has tubular inner and outer conductors. The inner conductor has a series of spaced annular grooves formed by forcing its metal into grooved mandrels inside the conductor by conjoint radial and axial forces produced by a hydraulic ram and subsequent groove shaping by a rolling operation so that the outer surface of the inner conductor is smooth and continuous. Teflon disc insulators, each having an uninterrupted outer periphery and an inner periphery interrupted at four points by radially extending slits, are slid axially along the inner conductor and positioned in the corresponding grooves. The inner conductor-disc assembly is then inserted into the outer conductor so that the discs support the two conductors in coaxial relation.

---

This application is a divisional application of my copending application Ser. No. 431,829, filed Feb. 11, 1965.

This invention relates to methods and apparatus for manufacturing electrical transmission lines of the coaxial type.

A coaxial transmission line includes an outer conductor, typically a cylindrical tube, and an inner conductor coaxially supported within the outer conductor, and this invention relates to the type of coaxial transmission line in which the inner conductor is also tubular. It is essential to maintain the coaxial relationship of the two conductors in the transmission line and for this purpose dielectric supports are spaced at intervals along the length of the transmission line to maintain the tube conductors in position. Such transmission lines are well-known and a conventional positioning support for the dielectric member is a machined bushing of electrical conductive material, usually of the same conductivity as the material of the inner conductor. The bushing is contoured to receive the dielectric member, typically a disc, and each end of the bushing is machined so that it will fit securely inside the ends of adjacent sections of inner conductor tubing. The tubing which is to serve as the inner conductor is then cut to specified lengths as determined by mechanical support and electrical performance considerations. Each disc requires a bushing, and two soldered or welded joints are required for securing the respective ends of the tubing to each bushing. The bushings, which form an electrical portion of the electric circuit of the transmission line, must be accurately made and smoothly finished in view of the radio frequency fields to which they are exposed. The machining operations are expensive in view of the precision required and also result in the waste of material. Further, the tubing must be cut into short lengths and then soldered or welded together again to the bushings to form the total length of inner conductor, further increasing the cost of the assembly.

Another problem that arises in connection with such transmission lines relates to the disc support. Conventionally, the disc is cut through both its inner and outer peripheries so that it may be spread apart and fitted onto the inner conductor with its inner periphery seated in the groove in the bushing. The insulator, which is principally performing a mechanical function by supporting a significant amount of weight but also affects the electrical characteristics of the line, often must be distorted substantially in order to place it onto the inner conductor, and this distortion results in permanent deformation of the disc which modifies the dielectric characteristics of the transmission line. The degree of permanent distortion varies widely and, therefore, is difficult to compensate for in the design of the transmission line. Also, the disc may not seat properly in the groove or the positioning of the inner conductor within the outer conductor may create friction forces against the distorted outer periphery of the disc which tend to partially draw it out of the groove in the bushing in which it is positioned. While the groove in the bushing is frequently modified to provide better mechanical support for the insulator and reduce this tendency to pull the disc out on assembly, such modification degrades the electrical characteristics of the transmission line. Due to the nature of the transmission line, it is very difficult to determine the position of the dielectric disc after assembly, and therefore, the assembly of quality coaxial transmission lines of this type requires a high degree of care and skill.

Accordingly, it is an object of this invention to provide a novel and improved method of manufacturing a coaxial transmission line.

Still another object of the invention is to provide a novel and improved method of manufacturing a coaxial transmission line configuration support for a disc insulator.

Still another object of the invention is to provide novel and improved methods for manufacturing coaxial transmission line components.

The coaxial transmission line constructed in accordance with the invention includes a tubular outer conductor and a tubular inner conductor disposed coaxially within the outer conductor. The tubular inner conductor has a continuous wall of substantially uniform thickness and along the length of the inner conductor annular depressions are formed at spaced intervals. Each annular depression, formed without any interruption in the continuity of the inner conductor, receives a dielectric support disc, which disc preferably has an uninterrupted outer periphery and an inner periphery that is interrupted at a plurality of points. Interruptions in the disc material extend toward the outer periphery radially, spirally, or otherwise as desired. Each disc may be slid axially along the tubular inner conductor such that the distortion effects are principally produced at points between the inner and outer peripheries, and its outer periphery is subjected to substantially no permanent distortion. The portion of the disc adjacent its inner periphery is seated in the groove so that it returns to substantially its original configuration and provides uniform circumferential support for the inner conductor.

To form each annual groove a mandrel having an annular recess is inserted inside the inner conductor tube and aligned with a tube deforming apparatus. The deforming apparatus is then actuated and exerts inward pressure uniformly around the tube and forces tube material into the annular recess in the mandrel. During this application of pressure one end of the inner conductor is fed toward the mandrel so that the annular depression in the tube is formed without any substantial thinning of the tube wall. This depression then may be further shaped in a rolling operation to provide accurately defined support walls and a seating surface for the disc insulator. The tubing is subjected to only moderate stress during these operations, and no heating, soldering or welding of the conductor is required so that there is no significant impairment of its electrical characteristics. Also, there are no seams or burrs in the conductor, but rather a smooth surface which enhances the mechanical and electrical capabilities and performance of the coaxial line. Further, there are no foreign contaminants, such as soldering fluxes, introduced into the interior of the line which may affect its performance. The tubing, after it is formed with these grooves, is cut to the precise length desired for the ultimate length of coaxial line and therefore the number of cutting operations and the tolerances for such cutting operations are reduced.

Other objects, features and advantages of the invention will be seen as the following description of a particular embodiment thereof progresses, in conjunction with the drawings, in which:

FIG. 1 is a side elevational view, partially in section, of a coaxial transmission line constructed in accordance with the invention;

FIG. 2 is a perspective view of a disc insulator utilized in the transmission line shown in FIG. 1;

FIG. 3 is a perspective view of a method of assembly of the disc insulator on the inner conductor of the coaxial line;

FIG. 4 is a view, partially in section, of the disc insulator and tubular inner conductor in assembled relationship;

FIG. 5 is a diagrammatic view of apparatus for forming the annular groove in the tubular inner conductor;

FIG. 6 is a view of the pressure applying apparatus for deforming the tubular inner conductor;

FIG. 7 is a sectional view showing the relation of the pressure applying apparatus, mandrel and inner conductor prior to deformation;

FIG. 8 is a second view similar to FIG. 7 showing the positions of apparatus when the tube is being deformed;

FIG. 9 is a top plan view of the rolling apparatus used for modifying the groove formed by the apparatus shown in FIGS. 5–7;

FIGS. 10, 11, and 12 are sectional views taken along the lines 10—10, 11—11, and 12—12, respectively, of FIG. 9; and FIG. 13 is a sectional view similar to FIG. 12 showing the final forming of the groove in the inner conductor by the contoured rolls of the apparatus shown in FIGS. 9–12.

With reference to FIG. 1 there is shown a length of coaxial transmission line having a tubular outer conductor 10 and a tubular inner conductor 12. End flanges 14, 16 of conventional configuration are employed for securing lengths of coaxial line together, and the inner conductor has a joint assembly 18 which is adapted to receive the end of a cooperating transmission line portion such as indicated at 20. The inner conductor 12 is supported in spaced relation from the outer conductor 10 by a series of disc insulators 22 of configuration that is indicated in FIG. 2.

Each disc 22 is made of a suitable dielectric material such as polytetrafluoroethylene (Teflon) which has a continuous outer peripheral surface 24 and an inner peripheral surface 26 that is interrupted along four lines 28. These interruptions 28 extend radially outwardly from the inner peripheral surface to apertures 30 which effect an increase in the flexibility of inner portions of the disc relative to its continuous outer periphery.

Each disc 22 is received in an annular groove 34 which has a base portion 36 which supports the inner peripheral surface 26 of the disc and two opposed side wall portions 38, 40 which provide axial positioning and support for the disc as shown in FIGS. 1 and 4. These discs are disposed in grooves spaced along the length of the inner conductor 12 at distances so that the discs will provide adequate mechanical support for the inner conductor 12 relative to the outer conductor 10. It will be noted that at each groove 34 there is positioned within the inner conductor 12 a mandrel 42 which has a recess 44 having side walls which define surfaces 38 and 40 of the annular groove 34. The bottom surface member 36 of the groove 34 is normally spaced from the bottom of the recess in the mandrel 42.

Each disc 22 may be positioned on the inner conductor by the method indicated in FIG. 3 in that the disc is slid in the axial direction along tubing 12 as displacement of the inner peripheral surfaces is permitted by the plurality of outwardly extending interruptions 28 without distorting the outer peripheral surface 24. Upon reaching the annular groove 34, the inner peripheral portion of the disc insulator slips into the groove and the disc insulator is adjusted to the position shown in FIG. 4 so that its major dimension extends perpendicularly to the inner conductor 12. In this position the smooth and continuous outer periphery 24 of the insulator is substantially undistorted and therefore provides a smooth mating surface for cooperation with the inner surface of the outer conductor 10 so that the inner conductor with disc supports 22 secured in place may be slid into the outer conductor to the position shown in FIG. 1 without substantial significant distortion of the discs. Prior to the coaxial assembly of the two tubes, the fittings of flanges and coupling as desired may be completed.

Apparatus for forming the annular groove in the inner conductor is indicated in diagrammatic form in FIG. 5. With reference to that figure, there is provided tube reducing apparatus including a hydraulic ram structure 50 which acts on a reducing member disposed within collar 52. An end plate 54 is secured to the base member 56 which supports ram structure 50, and pressure transmitting guides 58, 60 are disposed between the collar structure 52, the hydraulic ram structure 50, and the end plate structure 54, respectively. Suitable supports 62 are provided for the tubular inner conductor 12 and a guide rod 64 having a threaded end to which a mandrel 42 may be secured enables a mandrel to be positioned within the tube 12 in precise alignment with collar 52.

Additional details of this structure may be had with reference to FIGS. 6–8. The hydraulic ram structure 50 includes cylinder 70 having a hollow ram 72 through which the tube 12 passes. Secured to end plate 54 at one end of the apparatus is a pneumatically operated tube grip generally indicated at 74, and at the opposite end of the apparatus is a similar type tube grip 76 which is mounted for movement with the ram 72 and is connected to that ram by tie rods 78. The collar 52 has a resilient ring 80 secured within it and collar 52 acts to limit the radial movement of the resilient ring 80 outwardly. Positioned between the resilient ring 80 and the ram head 72 are a pair of half-shell dies 82, 84 which make up guide 60 and fit relatively closely over the outer surface of the tube 12 and couple the deforming force to ring 80 while guiding the tube during the deforming operation. A similar set of half-shell dies 86, 88 which make up guide 58 is positioned between the resilient ring 80 and the end plate 54. The ends of these dies are received within close fit bores indicated at 90, but those control bores are limited in length to facilitate the disassembling of the half-shell dies after the ram is retracted to permit the tubing 12 to be moved from one station to the next after formation of the groove 34. Tie rods 92 couple the end plate 54 and the remote end of the hydraulic ram apparatus together.

In operation, the tube 12 is first inserted in the apparatus through the collar 52 as indicated in FIGS. 5 and 6. The half-shell dies 82, 84, 86, 88 are then positioned in place to snugly fit over the tube. Mandrel 42, secured to rod 64, is then inserted in the tube and precisely positioned relative to ring 80 by appropriate control means. The hydraulic ram apparatus 50 is then actuated and moves the ram 72 towards the end plate 54 (towards the position indicated in FIG. 8). This movement acts to compress the resilient ring 80 and causes it to bulge inwardly as indicated in FIG. 8 and deform the relatively soft copper tube into a depressed configuration in alignment with the recess in the mandrel as indicated in FIG. 8. At the same time the hydraulic ram is acting through tie rod 78 on grip 76 to feed that portion of the tube 12 axially so that tube material is being fed at the same time that the depression is being formed. In a typical groove forming operation, the travel of the ram 72 is in the order of one quarter inch and the length of tube 12 is reduced about one tenth of an inch. This conjoint feeding action substantially eliminates any tendency to reduce the wall thickness of the tubing as the depression is being formed.

Through adjustment of the magnitude of force applied by traveling grip 76 and the timing of the application of that gripping force, excellent control over the degree of wall thickness reduction can be obtained. After the depression has been formed by this apparatus, the hydraulic ram is retracted, permitting the tube 12 to be moved within the reducing apparatus; the positioning rod 64 is unscrewed from mandrel 42, removed from the machine and reloaded with another mandrel; and the apparatus is reset in position for the next reduction operation.

Mandrel 42 is made of brass which is easily machined to provide smoothly curved surfaces 94 at the entrance of recess 44. In addition, the outer corners 96 are also curved to facilitate its insertion into the tube 12. It will be noted that the machining operation required for forming this mandrel is simple and does not require great precision.

Usually the groove formed by the reducing apparatus shown in FIGS. 5-8 is not sufficient, and therefore, a rolling operation to further form the groove is performed by the apparatus shown in FIGS. 9-12. This apparatus employs three contoured hardened steel rolls 100, 102, 104. Each roll has a ridge portion 106 which, as best shown in FIG. 12, has a flat base 108 and two vertical side walls 110, 112, and control surfaces 114. Rolls 100 and 102 are rotatably mounted on arm structure 116, while roll 104 is rotatably mounted on similar arm structure 118. The two arm structures are pivotally attached to a dual member link structure 120 so that the three rolls may be arranged in triangular relationship relative to the tubing 12 when it is positioned therebetween.

In operation of this rolling apparatus, the tube 12 with the annular depression formed therein is positioned relative to the rolling structure as shown in FIG. 12. The arms 116, 118 are then moved towards one another so that the ridges 106 move into the depression. Arm members 116 and 118 are forced towards one another as the structure is rotated relative to the tube. This rolling operation further deforms the metal in the depression into a groove having the vertical side walls 38, 40 and base 36 of limited depth so that the stress on the metal during the forming of the groove 34 is minimized. The final position of the contoured rolls in the groove forming operation is indicated in FIG. 13 with control surfaces 114 engaging the outer surface of tube 12. This operation can be performed by one man on the tubing after the mandrels have initially been secured in place and the depressions formed.

After the grooves have been formed in this rolling operation, the Teflon disc 22 is slid axially along the inner conductor until its inner periphery enters the groove 34 and then is positioned as shown in FIG. 4 so that its inner peripheral surface is seated in the groove 34. The suitable couplings or end structures are assembled on the coaxial transmission line structure and the inner conductor 12 with the several discs 22 positioned on it is slid into the outer conductor 10 to the position shown in FIG. 1 to complete the assembly as indicated above.

While a particular embodiment of the invention has been shown and described, it is recognized that many modifications will occur to those of ordinary skill in the art, and therefore, it is not intended that the invention be limited to the disclosed embodiment or to details thereof and departures may be made therefrom within the spirit and scope of the invention as defined in the claims.

What is claimed is:

1. In the manufacture of a coaxial electrical transmission line, the steps of clamping an elongated tubular conductor component at two axially spaced points, positioning a mandrel having a support surface of configuration substantially the same as the configuration of said elongated tubular conductor component of the transmission line in supporting relation to said conductor component, said support surface having an annular recess therein, applying pressure in a radial direction to said tubular conductor component at the point at which said mandrel is positioned to force the metal in said conductor component into the recess in said mandrel to form an annular groove in said conductor component while maintaining the smooth continuity of the surface of said conductor component, and moving one of said clamping points toward the other clamping point to apply force to said conductor component in the direction of its length during the application of said pressure to said conductor component to reduce the length of said conductor component so that said annular groove is formed without any substantial reduction in the thickness of the wall of said conductor component at that point.

2. The method as claimed in claim 1 wherein said conductor component is of circular cross-sectional configuration, and further including the further step of forcing the metal of said conductor groove into the recess in said mandrel in a rolling operation.

3. The method as claimed in claim 2 and further including the steps of disposing a dielectric disc member in said groove, and inserting said conductor component and said disc member into a second conductor component so that said first and second conductor components are supported in coaxial relation by said disc member.

4. In the manufacture of a coaxial electrical transmission line, the steps of clamping a tubular conductor component at two axially spaced points, positioning a cylindrical mandrel of diameter substantially the same as the inner diameter of said tubular conductor component inside said component between said two spaced points to support an annular portion of said conductor component, the surface of said cylindrical mandrel having an annular recess therein, positioning a resilient disc member over said conductor component in alignment with said annular recess, applying pressure to said disc member to force the metal in the tube wall of said conductor component into the recess in said mandrel to form an annular groove in said conductor component, and moving one of said clamping points toward the other during the application of said radial pressure to said tubular conductor to reduce the length of said conductor component so that said conductor metal is forced into said recess without any substantial reduction in the wall thickness of said conductor component.

5. The method as claimed in claim 4 and further including the steps of disposing a dielectric disc member in said groove, and inserting said conductor component and said disc member into a second conductor component so that said first and second conductor components are supported in coaxial relation by said disc member.

References Cited

UNITED STATES PATENTS

| | | | |
|---|---|---|---|
| 1,859,390 | 5/1932 | Green | 333—96 |
| 1,944,890 | 1/1934 | Heidloff | 285—256 |
| 2,035,545 | 3/1936 | Green | 333—96 |
| 2,429,293 | 10/1947 | Peck et al. | 29—148.4 |
| 2,854,744 | 10/1958 | Crockett | 29—516 |
| 2,955,505 | 10/1960 | Schuster | 85—5 |
| 3,204,331 | 9/1965 | Looker | 29—520 X |
| 3,232,162 | 2/1966 | Ketchum | 29—520 X |

THOMAS H. EAGER, *Primary Examiner.*